(12) United States Patent  (10) Patent No.: US 6,654,983 B1
Raynaud  (45) Date of Patent: Dec. 2, 2003

(54) MOTOR VEHICLE WINDSCREEN WIPER

(75) Inventor: Richard Raynaud, Champeix (FR)

(73) Assignee: Valeo Systemes d'Essuyage (FR)

( * ) Notice: Subject to any disclaimer, the term of this patent is extended or adjusted under 35 U.S.C. 154(b) by 0 days.

(21) Appl. No.: 09/762,422

(22) PCT Filed: Jul. 16, 1999

(86) PCT No.: PCT/FR99/01739

§ 371 (c)(1),
(2), (4) Date: Mar. 23, 2001

(87) PCT Pub. No.: WO00/07857

PCT Pub. Date: Feb. 17, 2000

(30) Foreign Application Priority Data

Aug. 7, 1998 (FR) .............................................. 98 10209

(51) Int. Cl.$^7$ .................................................. B60S 1/40
(52) U.S. Cl. ............................... 15/250.32; 15/250.351
(58) Field of Search ....................... 15/250.32, 250.351, 15/250.44, 250.361, 250.43, 250.48

(56) References Cited

U.S. PATENT DOCUMENTS 4,179,767 A * 12/1979 Weiler et al. ............. 15/250.32
4,418,441 A    12/1983 van den berg ........... 15/250.46

FOREIGN PATENT DOCUMENTS

| DE | 42 24 866 | 2/1994 | | |
|---|---|---|---|---|
| EP | 0 236 061 | 9/1987 | | |
| GB | 1433668 | * | 4/1976 | .............. 15/250.32 |

* cited by examiner

Primary Examiner—Gary K. Graham
(74) Attorney, Agent, or Firm—J. Gordon Lewis

(57) ABSTRACT

The invention concerns a motor vehicle windscreen wiper wherein a wiper blade is articulated at the longitudinal front end of a wiper arm about a horizontal transverse axis (A1) via a connector which is articulated on the blade, wherein the connector comprises articulating means borne by two parallel longitudinal flanks between which the blade is houses, the connector articulation means co-operating with the blade matching means. The connector flanks are housed in two lateral flanges of the end of the arm, and the connector comprises a safety thruster, with a button received in the slot of the arm to block the connector longitudinally relative to the arm, extended by a safety latch co-operating with locking elastic means.

13 Claims, 5 Drawing Sheets

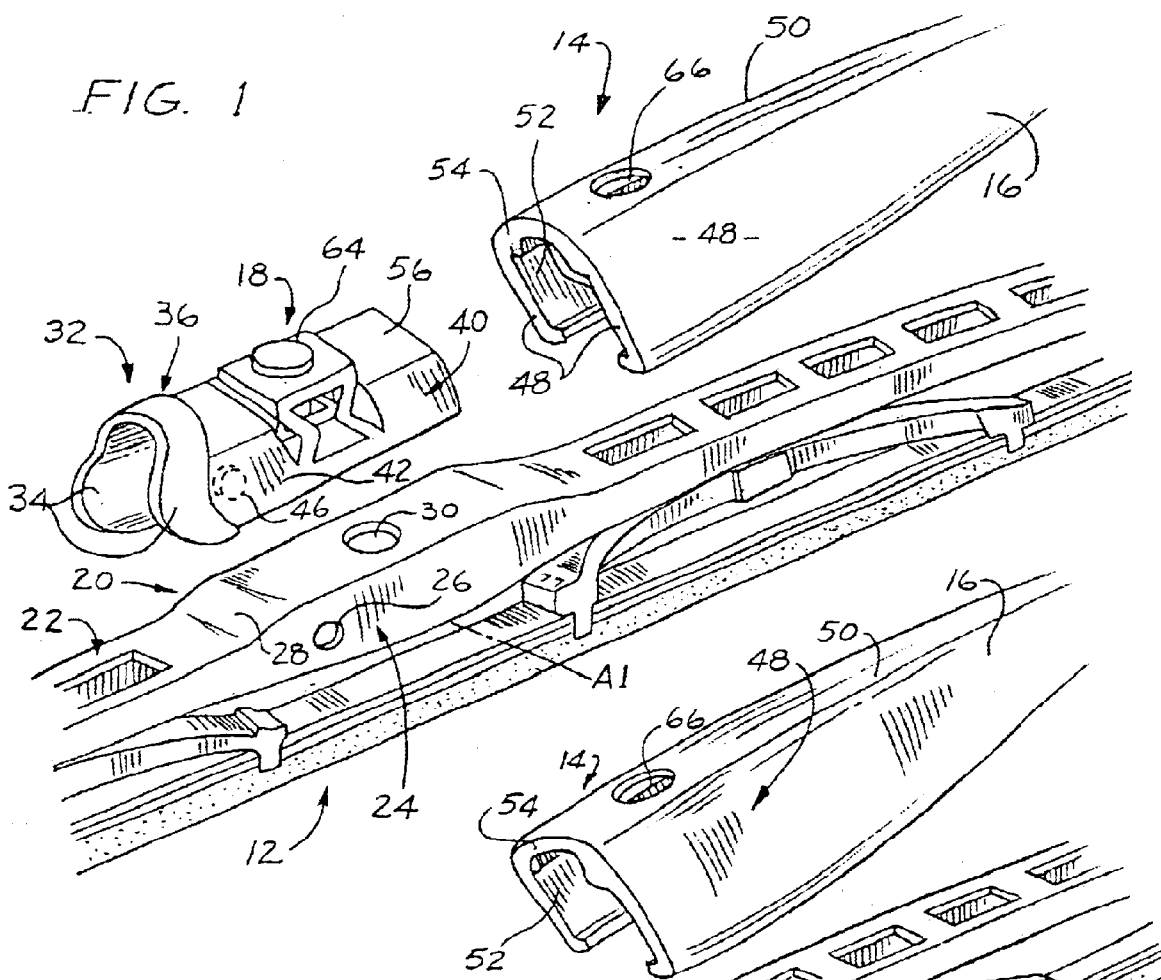

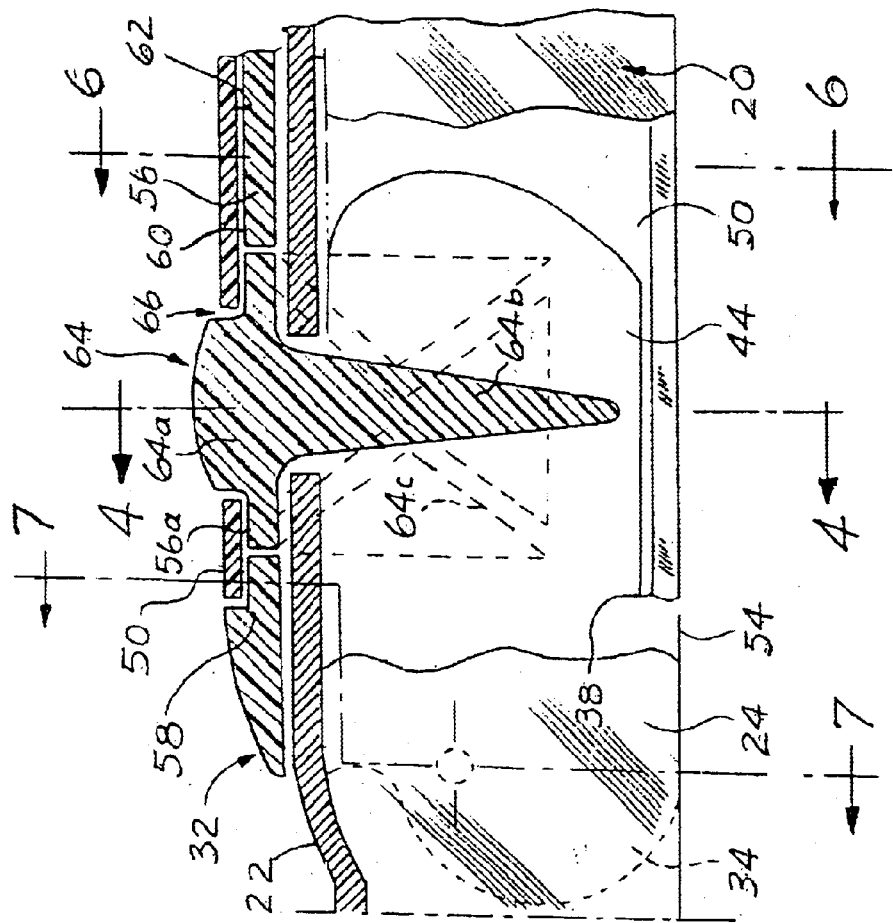
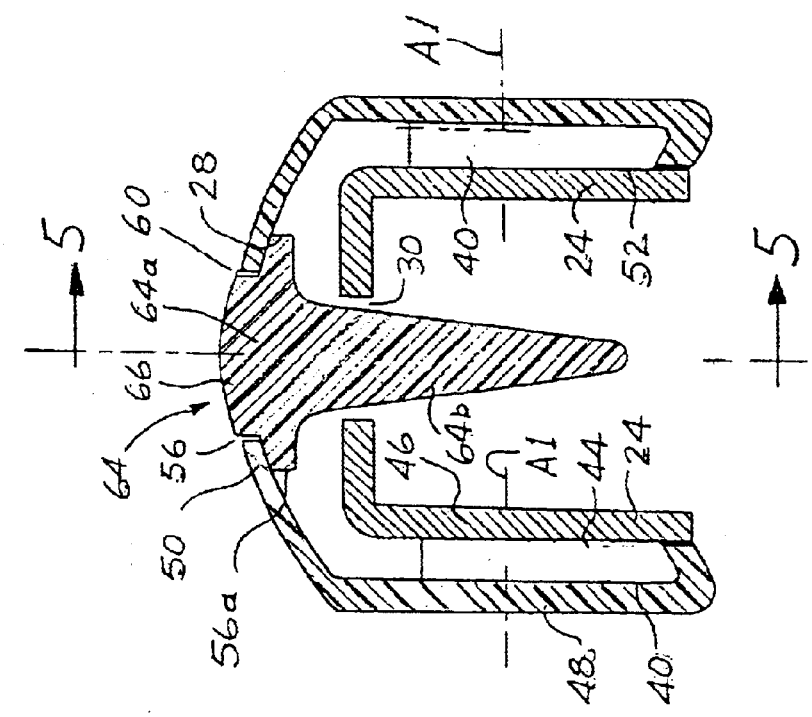
FIG. 5
FIG. 4

MOTOR VEHICLE WINDSCREEN WIPER

BACKGROUND

The invention concerns a motor vehicle windshield wiper including advanced linking means of a wiper blade onto a wiper arm.

The invention concerns more specifically a motor vehicle wiper wherein a wiper blade is attached at the front longitudinal end of a wiper arm, around a horizontal transverse axis, by means of a connector that is mounted on the blade.

According to a known method of connection of the assembly articulated on a blade at the end of an arm, the connector is elastically encased in the radial direction on an articulation rod of the blade and the front end of the arm is longitudinally hooked in order to form a hook in which the connector, once mounted on the blade, must be engaged longitudinally from the back to the front.

For reasons of rigidity and compactness of the articulation, but also for aesthetic reasons, the connector is generally housed between two lateral flanges of the blade that are joined by the articulation rod. In this way, the front end of the arm must also be housed between the blade flanges, in front of the connector in relation to the blade in order to allow the engagement of the connector in the hook of the arm.

Such an assembly, if it presents guaranties of reliability, results in being especially delicate to carry out and imposes that the blade, in front of the articulation rod, presents an opening created in the upper back of the blade in order to allow the engagement of the front end of the arm. Such an opening remains at least partially apparent after the assembly of the blade on the arm and provokes the appearance of an airflow that interferes with the functioning.

SUMMARY

The goal of this invention is to propose a new conception of the articulation means of the blade onto the arm that allows easy assembly and disassembly of the blade, even by someone not trained. Actually, the owner of the vehicle is encouraged to regularly change his wiper blades and he can proceed in this operation in the simplest manner possible.

In addition, the wipers being visible parts of the vehicle's exterior, it is desirable to give them an aesthetic character, avoiding, as much as possible, the discontinuity of their form. Also, the airflow that results from these discontinuities should be avoided in order to block these annoying interferences.

In order to achieve these objectives, it is proposed to integrate elastic securing means onto the connector, which is removable by simple pressure.

More specifically, this invention involves a wiper of the type described above, in which the connector contains articulation means carried by two parallel longitudinal flanges between which the blade is housed, the articulation means of the connector cooperating with the complementary means of the blade, the flanges of the connector being housed between two lateral flanges at the end of the arm. In addition, the connector contains a securing thruster, presenting a button, housed in an slot of the arm in order to longitudinally block the connector in relation to the arm, extended by a safety latch cooperating with the elastic means of locking, and removable by pressure exerted on the button.

According to the specific methods of production of the invention:

the flanges of the connector are housed via longitudinal sliding each respectively into one of two holes created in the internal faces, in relation to the two lateral flanges, of the front end of the arm;

the elastic means for locking the longitudinal blocking of the connector in relation to the arm are made up of elastic legs formed in the sides of the connector;

The elastic locking means are formed from an elastic strip which extends horizontally toward the back from the front casing to which it is joined by its front end, forming a hinge on the horizontal axis, the strip supporting the thruster of which the rod is terminated by a locking overhang able to be inserted and removed from the blade via disappearing towards the arm, through a gap of such a size adapted to fit in the blade, and via pivoting of the elastic strip in order to lock or free the longitudinal blocking of the connector in relation to the arm;

variably, the locking means are formed by a helical screw extending the length of the safety latch and pushing on a folding of the blade coming opposite to the latch.

the lateral flanges of the arm are hooked by coining and arching in order to obtain a wedging in the sides of the connector, specifically during torsion pushes;

the sides of the connector includes two cylindrical lugs on the horizontal axis which extend away from each other from the faces opposite the two sides, and which are designed to be housed in the corresponding holes in the sides of the blade while the sides are in articulation position in order to assure the articulated assembly of the connector onto the blade;

the casing in front of the connector pushes longitudinally towards the back via a rear transversal face against a front transversal face of the end of the arm; and the external faces of the front casing of the connector are constructed in the extension of the corresponding external faces of the front end of the arm.

BRIEF DESCRIPTION OF THE DRAWING

Other characteristics and advantages of this invention will appear in the reading of the detailed description which follows and for the comprehension of which one will refer to the attached drawings which respectively represent:

FIGS. 1, 2, and 3 are partial perspective views of a wiper according to the invention illustrating three successive stages of the assembly of the blade onto the arm;

FIG. 4 is a transverse cross section view according to line 4—4 of FIG. 5, illustrating an example of production of the connector;

FIG. 5 is a partial view cut longitudinally according to line 5—5 of FIG. 4;

DETAILED DESCRIPTION

Figure 3:
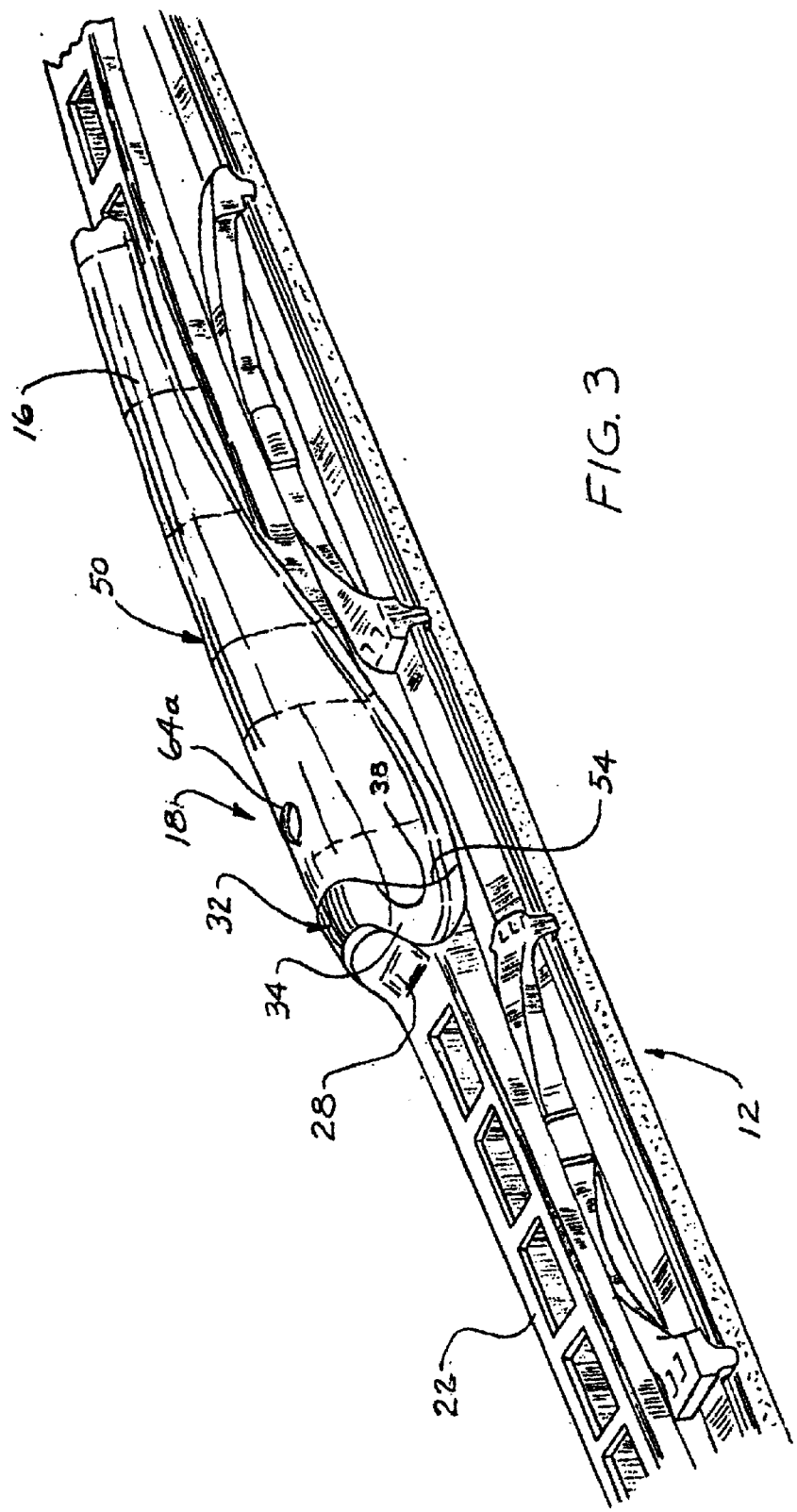
Figure 7:
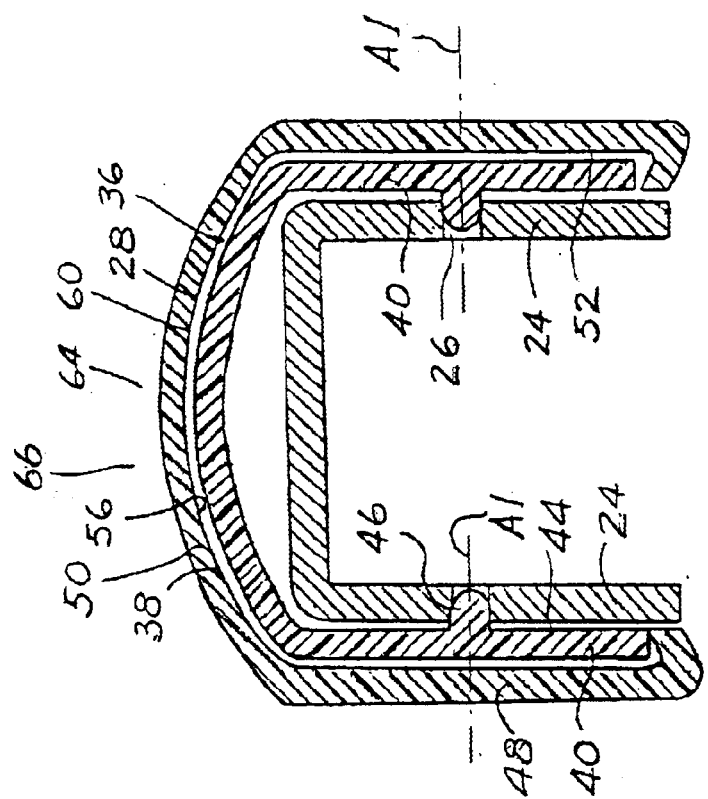
FIGS. 6 and 7 represent partial views of a transversal section respectively according to lines 6—6 and 7—7 on FIG. 5.

Represented in the drawing is a wiper 10 including a wiper blade 12 that is designed to be mounted in contact around a transversal axis A1, horizontal in the view of the figures, at the longitudinal front end 14 of a wiper arm 16.

To this effect, it is planned that a connector 18 that is mounted articulatingly on a central part 20 of articlulation of a principal binding 22 of the blade 12 and which is designed to be fixed at the front end 14 of the arm 16.

As one can see in the Figures, the central part 20 of the articulation of the blade 12 includes two lateral longitudinal sides 24 that are parallel and are each fitted with a circular orifice 26 on the axis A1. The two sides 24 are linked via an upper back 28 and a circular opening 30 arranged in the upper back 28 at the level of the central part 20 of the articulation portion.

The connector 18 includes a front casing 32 that presents in a transversal section a shape of an upside-down U shape including two lateral vertical branches 34 and an upper horizontal transversal branch 36. The front casing 32 is designed to overlap the binding 22 of the wiper blade 12.

From a rear transversal face 38 of the front casing 32, two parallel sides 40 extend longitudinally towards the back in the extension of the vertical branches 34 of the front casing 32. The sides 40 present themselves in the shape of plates that extend in a vertical plane and are joined via a back 56. It is possible, by elastic deformation, to transversally spread the sides away from one another making them pivot around each other at their front end 42 of linking with the front casing 32 to form a vertical hinge axis.

The sides 40 each carry, on an internal face 44 turned in the direction of the opposite wing, a cylindrical lug 46 that extends transversally according to the axis A1 in the direction of the opposite side 40. In its free state, the internal faces 44 of the sides 40 are spread apart from each other at a distance equal to the transversal length of the central portion 20 of articulation of the blade 12.

In this way, the cylindrical lugs 46 are capable of being housed in the circular holes 26 in the sides 24 of the blade 12.

However, while the sides 40 are spread transversally apart, the lugs 46 are removed from their holes 26 in a way such that the connector 18 can be engaged or disengaged in the vertical direction in relation to the blade 12.

It will be understood that it is planned that the lugs can be borne by the blade 12 and can be housed in the holes created in the sides 40 of the connector 18. It is notable that it is planned that sufficient space between the upper back 28 of the binding 22 and the upper transverse branch 36 of the front casing 32 of the connector 18 is provided in order to allow a sufficient backlash in rotation to the connector 18 in relation to the blade 12.

It is notable,that it is planned that sufficient space between the upper back 28 of the binding 22 and the upper transverse branch 36 of the front casing 32 of the connector 18 is provided in order to allow a sufficient backlash in rotation to the connector 18 in relation to the blade 12.

The sides 40 of the connector 18 are designed to be housed in the interior of the front end 14 of the arm 18 in such a way that the end 14 blocks all spreading of the sides 40, provoked, for example, by the torsion push during the functioning of the blade. In addition, while the connector 18 is mounted on the blade 12 and is engaged in the front end 14 of the arm 16, the lugs 46 of the sides 40 cannot be disengaged from the holes 26, which blocks all disassembly of the connector 18 in relation to the blade 12.

In this way, the front end 14 of the arm 16 includes two longitudinal, vertical flanges 48 that are joined via a transverse upper back 50 and between which the sides 40 of the connector 18 are designed to be housed.

The transversal flanges 48 include, on the internal faces opposite each other, holes 52 of the same the shape as the sides 40 such that they can be introduced therein longitudinally from the front to the back. The lateral flanges of the arm 16 are hooked by coining and arching in order to obtain a wedging of the sides 40 of the connector.

Figure 8:
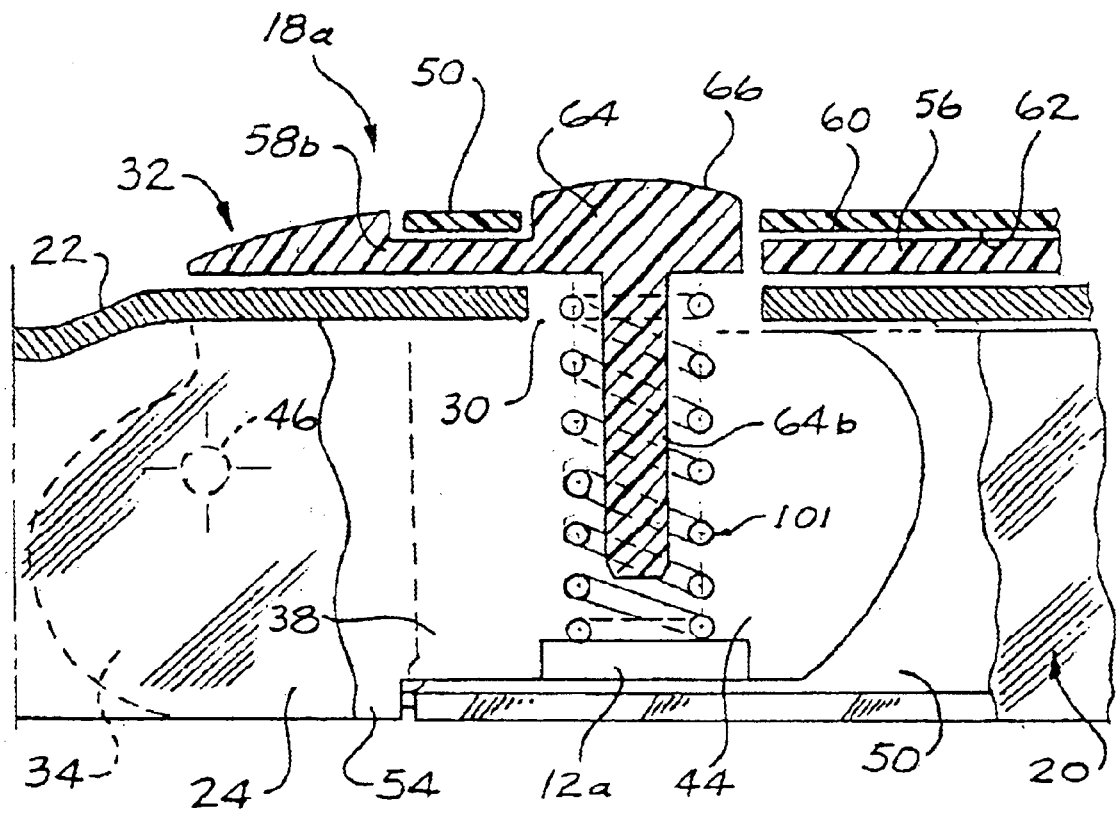
FIG. 8 is a view in a longitudinal direction illustrating another example of production of the connector.

As one can see in FIGS. 3, 5, and 8, the transverse rear face 38 of the front casing 32 is designed to push longitudinally towards the back against a transverse front face 54 of the front end 14 of the arm 16. Preferably, the front casing 32 and the front end 14 of the arm 16 are designed in the same way their respective external faces are created in the extension of one another in order to assure an aesthetic continuity between the arm 16 and the front casing 32 which stays visible on the exterior of the end 14 of the arm 16 while the sides 40 of the connector 18 are housed between the flanges 48.

It has been planned that the safety means that allow the locking of the connector 18 to the interior of the front end 14 of the arm 16 is in the form of a thruster, formed from an extended button via a finger cooperating with the elastic means. Advantageously, these means allow an easy unlocking in order to allow the replacement of the blade 12 when it is worn out.

In the production example seen in FIGS. 1 to 7, the thruster 64, including the extended button 64a via the finger 64b, cooperates with the elastic legs 64c supporting a portion 56a. The portion 56a, according to the back 56 of the connector 18, is placed between the button 64a and the finger 64b, and overhangs the rest of the back 56. The connector unit is formed by casting in this example of production.

As is more specifically illustrated in FIGS. 4 and 5, while the connector 18 is engaged in the front end 14 of the arm 16, a portion 56a adjusts into the extension of the back of the connector, opposite the upper face 60 of the back, in a way such that the legs 64c exert a force returning the back 50 to the arm. This force efficiently locks the connector 10 and the blade 12 under the guiding arm 14.

The button 64a is housed in a slot 66 formed in the upper back 50 of the arm 16 in such a way as to longitudinally immobilize the connector 18.

A push on the button 64a, against the recall force exerted onto the legs 64c, allows one to disengage the button of the slot 66 and to longitudinally unlock the connector 18 towards the front.

In addition, the opening 30, placed in the upper back 28 of binding 22 is, in this production example, of a diameter adapted to the finger 64b to hold the thruster, in combination with the elastic legs, in order to maintain an efficient locking to the blade.

The assembly of the wiper 10 according to the invention includes the following steps.

The connector 18 is first mounted on the blade 12 spreading the sides 40 of the connector 18 transversally apart from each other (assembly position) in such a manner to engage to connector 18 vertically from the top to the bottom straddling the central articulation portion 20 of the blade 12. While the lugs 46 of the wings 40 are opposite the holes 26 (FIG. 7), one relaxes the sides 40 (articulation position) in such a way that the lugs 46 are engaged in the holes 26 and create the articulated assembly of the connector 18 on the blade 12.

Figure 6:
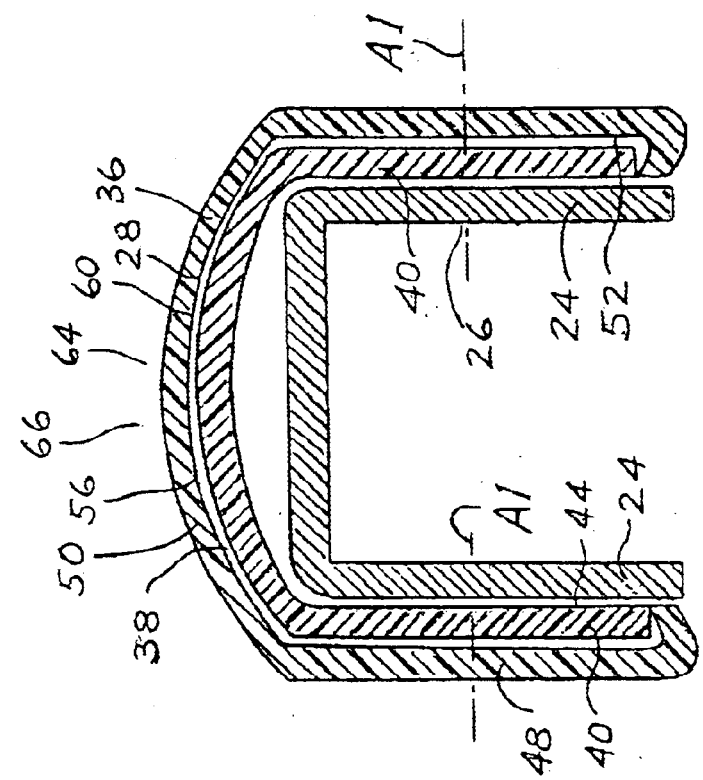

Then, the blade 12 and the connector 18 unit are engaged longitudinally from the front to the back to the interior of the front end 14 of the arm 16 in a manner such that the sides 40 of the connector 18 are housed in the holes 52 created in the flanges 48 in the front end 14 (FIG. 6). During this operation, it is necessary to wipe towards the bottom of the thruster 64 by exercising a pressure against the recall force of the legs 64c.

While the button 64a longitudinally arrives opposite from the slot 66 of the arm 16, it elastically returns to an intermediate position in which the portion 56a arrives opposite from the back 56 of the connector 18 in order to form a quasi-continuity.

Figure 9:
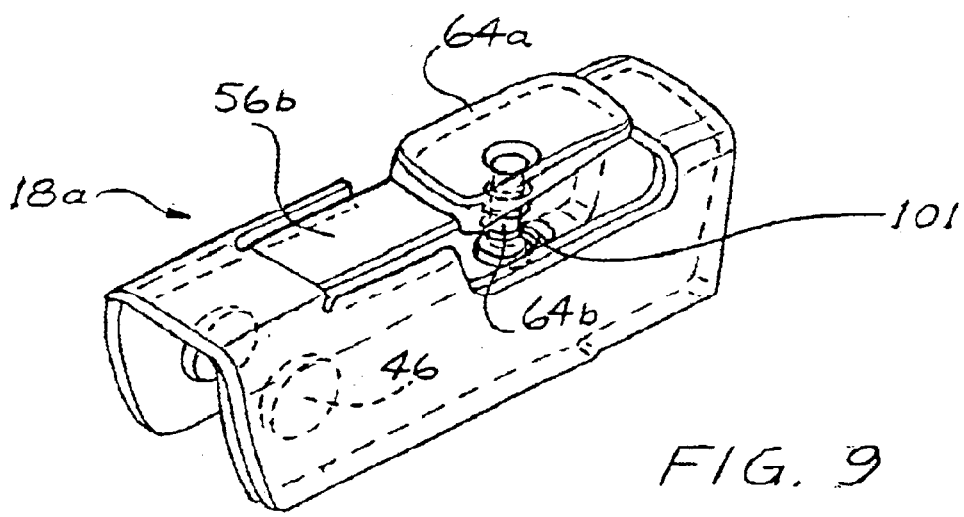
FIG. 9 is a perspective view of another method of production of the connector.

According to other production examples, as illustrated in FIGS. 8 and 9, the thruster 64, formed from a button 64a and the finger 64b, is mounted on the connector 18a via the intermediary of a tongue 56b. The tongue 56b acts like an elastic element for unlocking the blade on the arm. The tongue 56b, which is for example created in the shape of an horizontal plate element, which extends longitudinally towards the back, in the extension of the upper transverse branch 36 of the front casing 32 of the connector 18. The front end 58b of the tongue 56b forms a hinge axis notably horizontal for the tongue 56b.

In FIG. 8, the finger 64b cooperates with a helical spring 100 that pushes on a bent part 12a bent back from the blade coming opposite the finger.

In FIG. 9, the finger 64b is ended by a locking overhang capable of being introduced and removed from the blade via folding away towards the bottom, across a gap 30 of the size adapted formed in the blade (FIG. 1), and via pivoting of the elastic tongue in order to lock or free the longitudinal block of the connector in relation to the arm.

The invention is not limited to the realization examples described and represented. It is possible to foresee other elastic locking means, for example, transverse rods cooperating with hooks placed at the end of the finger of the thruster.

What is claimed is:

1. A motor vehicle wiper, wherein a wiper blade is articulated at a front longitudinal end of a wiper arm, around a horizontal transversal axis, via an intermediary of a connector which is articulated on the blade, characterized by the connector containing articulation means carried by two parallel longitudinal flanges between which is housed the blade, the articulation means cooperating with complementary means of the blade, the flanges of the connector being housed between two lateral flanges of the front end of the wiper arm, and wherein the connector includes a safety thruster, presenting a button, housed in an slot of the wiper arm in order to longitudinally block the connector in relation to the wiper arm, extended by a safety latch cooperating with elastic locking means, able to be freed by pressure exerted on the button.

2. The wiper according to claim 1, characterized by the connector having a front casing which presents itself in the shape of an inverted U in a transverse section and which straddles a portion of the blade and in which the two longitudinal flanges extend towards a back in relation to a front casing to which the two longitudinal flanges are joined by another front end.

3. The wiper according to claim 2, characterized by the connector having sides being housed via longitudinal sliding in the front end of the arm, each side respectively disposed in two holes created in internal faces opposite the two lateral flanges of the front end of the arm.

4. The wiper according to claim 3, characterized by holes of the lateral flanges of the front end of the arm are unblocked towards the front end, in which the connector is longitudinally engaged from front to back between the lateral flanges, and that the lateral flanges of the arm are hooked by coining and arching in order to obtain an arching of the sides of the connector.

5. The wiper according to claim 3, characterized by the elastic locking means that lock a longitudinal blocking of the connector in relation to the arm being made up of elastic legs formed in the sides of the connector.

6. The wiper according to claim 1, characterized by the elastic locking means for a longitudinal blocking of the connector, in relation to the arm, are made up of at least one elastic tongue which extends horizontally towards the back from the front casing to which the tongue is linked via a front end of the tongue, forming a horizontal hinge axis, the tongue supporting the thruster from which the finger is ended via an overhang of the locking means susceptible of being introduced and removed from the blade via escape towards the bottom, across from a gap, the adapted size formed in the blade, and via pivoting of the elastic tongue in order to lock or free the longitudinal blocking of the connector in relation to the arm.

7. The wiper according to claim 6, characterized by the elastic locking means being formed by a helical spring extending the length of the safety latch and pushing against a folding bringing the blade back opposite the finger.

8. The wiper according to claim 6, characterized by the elastic locking means being formed via an overhang formed at the end of the finger.

9. The wiper according to claim 1, characterized by the lateral flanges of the arm being hooked by coining and arching in order to obtain a wedging of the sides and the connector.

10. A motor vehicle wiper comprising:
a wiper arm;
a wiper blade with a binding, said wiper blade articulatable at one end of the wiper arm; and
a connector articulatingly communicating with the wiper blade, said connector having a safety thruster defined by a button housed in a slot in the wiper arm, said safety thruster having an extending safety latch cooperating with elastic locking means for releasing said wiper blade from the arm by pressure exerted on the button; wherein the elastic locking means is a helical spring extending an axial length of the safety latch, said spring pushing against a bent portion of the wiper blade and positioned opposite the safety latch.

11. A motor vehicle wiper comprising:
a wiper arm;
a wiper blade with a binding, said wiper blade articulatable at one end of the wiper arm; and
a connector articulatingly communicating with the wiper blade, said connector having a safety thruster defined by a button housed in a slot in the wiper arm, said safety thruster having an extending safety latch cooperating with elastic locking means for releasing said wiper blade from the arm by pressure exerted on the button wherein said binding has an opening with a diameter for receiving and holding the safety latch, and wherein said elastic locking means includes elastic legs which cooperate with the opening and safety latch to maintain an efficient locking to the blade.

12. The motor vehicle wiper of claim 11, wherein the safety thruster further includes a portion disposed between the button and the safety latch, said portion of the safety thruster adjusts into an extension of a back portion of the connector so that the elastic legs exert a force for locking the connector and the blade under a front portion of the arm.

13. A motor vehicle wiper comprising;

a wiper arm;

a wiper blade with a binding, said wiper blade articulatable at one end of the wiper arm; and a connector articulatingly communicating with the wiper blade, said connector having a safety thruster defined by a button housed in a slot in the wiper arm, said safety thruster having an extending safety latch cooperating with elastic locking means for releasing said wiper blade from the arm by pressure exerted on the button, wherein said connector has an articulation means carried by two parallel longitudinal flanges for receiving the blade therebetween and wherein the two parallel longitudinal flanges are disposed between two lateral flanges of the wiper arm.

* * * * *